United States Patent
Hjerto et al.

(10) Patent No.: US 9,515,812 B2
(45) Date of Patent: Dec. 6, 2016

(54) DATA TRANSFER BETWEEN CLOCK DOMAINS

(71) Applicant: NORDIC SEMICONDUCTOR ASA, Trondheim (NO)

(72) Inventors: Markus Bakka Hjerto, Oslo (NO); Frank Berntsen, Heimdal (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 0 days.

(21) Appl. No.: 14/411,208

(22) PCT Filed: Jun. 20, 2013

(86) PCT No.: PCT/GB2013/051608
§ 371 (c)(1),
(2) Date: Dec. 24, 2014

(87) PCT Pub. No.: WO2014/001765
PCT Pub. Date: Jan. 3, 2014

(65) Prior Publication Data
US 2015/0139373 A1    May 21, 2015

(30) Foreign Application Priority Data
Jun. 27, 2012 (GB) .................................. 1211425.2

(51) Int. Cl.
*H04L 7/00* (2006.01)
*H04L 27/26* (2006.01)
(Continued)

(52) U.S. Cl.
CPC .............. *H04L 7/0008* (2013.01); *G06F 5/06* (2013.01); *H04L 27/2655* (2013.01); *H04B 1/7073* (2013.01); *H04B 1/7156* (2013.01)

(58) Field of Classification Search
USPC ......... 327/141, 145; 375/354; 713/401, 500, 713/600
See application file for complete search history.

(56) References Cited

U.S. PATENT DOCUMENTS

| 5,150,313 A | 9/1992 | Van den Engh |
| 6,112,307 A * | 8/2000 | Ajanovic .................. G06F 1/12 713/400 |

(Continued)

FOREIGN PATENT DOCUMENTS

| EP | 0977109 A1 | 2/2000 |
| EP | 1950668 A1 | 7/2008 |

OTHER PUBLICATIONS

Form PCT/ISA/220 notification of transmittal of the international search report and written opinion of the international searching authority mailed Sep. 9, 2013, Form PCT/ISA/210 International Search Report, PCT/ISA/237 Written Opinion of the International Searching Authority for PCT/GB2013/051608.

(Continued)

*Primary Examiner* — Leon-Viet Nguyen
(74) *Attorney, Agent, or Firm* — Koppel, Patrick, Heybl & Philpott

(57) ABSTRACT

An arrangement for transferring a data signal from a first clock domain (bus_slow) to a second clock domain (bus_fast) in a digital system. The first clock domain (bus_slow) has a first clock (ck slow) with a frequency less than a frequency of a second clock (ck fast) in the second clock domain (bus_fast). The arrangement is configured to transfer the data signal from the first clock domain (bus_slow) to the second clock domain (bus_fast), detect whether a predetermined transition occurs in the first clock (ck slow) within a predetermined period of time, using detecting means (2) clocked by the second clock (ck fast), and transfer the data signal from the first clock domain (bus_slow) to the second (Continued)

Figure 1:
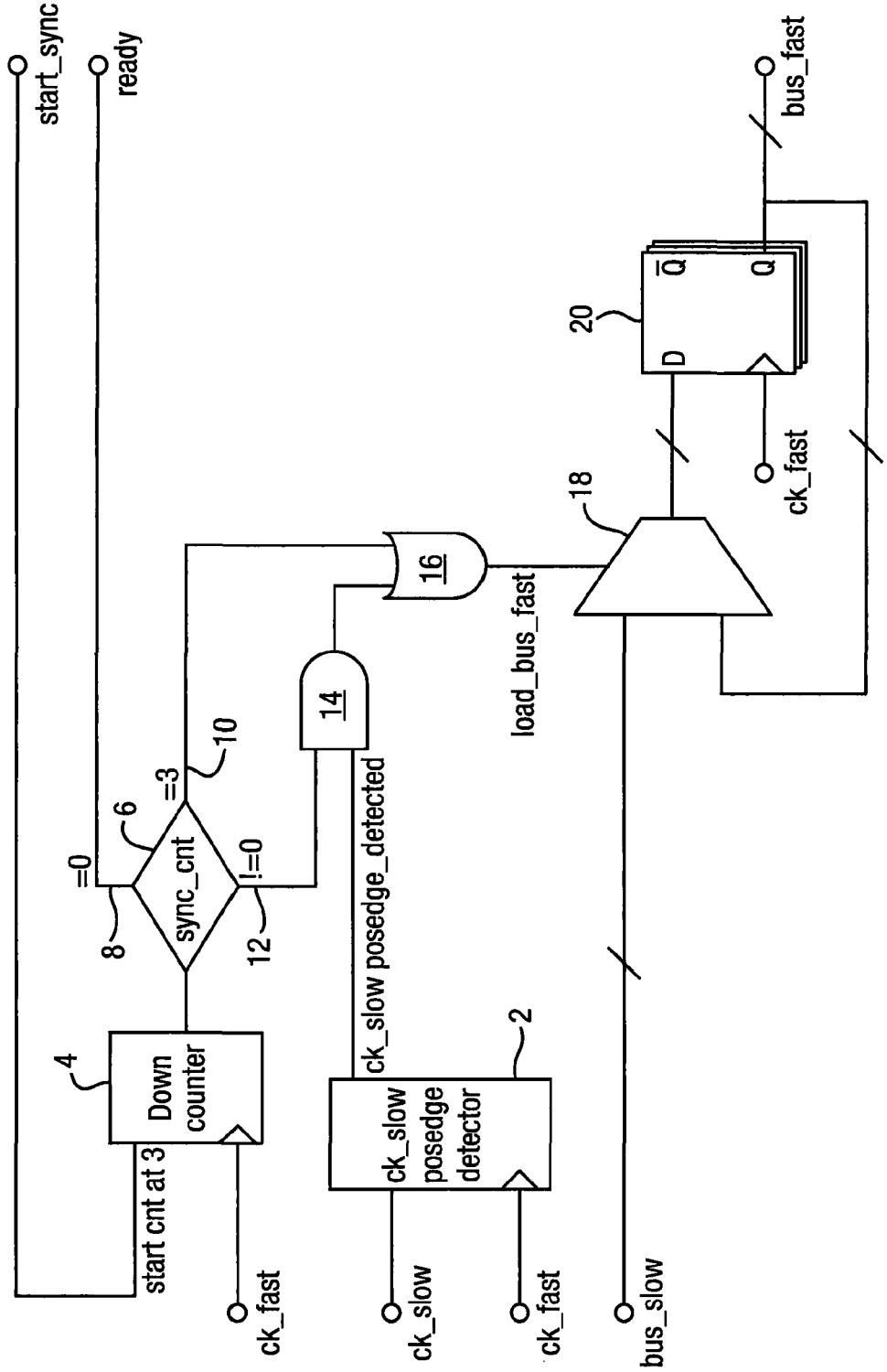

clock domain (bus_fast) again if the detecting means (2) detects the predetermined transition in the first clock (ck slow) within the predetermined period of time.

38 Claims, 2 Drawing Sheets

(51) Int. Cl.
  *G06F 5/06* (2006.01)
  *H04B 1/7156* (2011.01)
  *H04B 1/7073* (2011.01)

(56) References Cited

U.S. PATENT DOCUMENTS

| | | | | |
|---|---|---|---|---|
| 6,928,574 | B1 | 8/2005 | Radjassamy | |
| 7,809,972 | B2 * | 10/2010 | Tune | G06F 5/06 |
| | | | | 702/120 |
| 8,089,378 | B1 * | 1/2012 | Stoler | H03M 5/02 |
| | | | | 341/61 |
| 2003/0056137 | A1 * | 3/2003 | Huelskamp | A61N 1/372 |
| | | | | 713/600 |
| 2009/0217075 | A1 * | 8/2009 | Adar | G01R 31/31726 |
| | | | | 713/500 |
| 2009/0225915 | A1 * | 9/2009 | Hassan | H04L 7/0012 |
| | | | | 375/354 |

OTHER PUBLICATIONS

International Preliminary Report on Patentability from corresponding Appl. No. PCT/GB2013/051608, mailing date Jan. 8, 2015.

* cited by examiner

DATA TRANSFER BETWEEN CLOCK DOMAINS

This invention relates to systems and methods for transferring data signals between clock domains in digital systems, in particular where the clock domains are not synchronised.

In many different electronics systems, such as a wireless (e.g. Bluetooth) system, there exist two or more clock domains which run at different frequencies but are required, at least sporadically, to communicate with each other. For example, a central processor may run at a high frequency with one or more peripherals running at a low frequency. In addition, one of the clock domains may enter periods of inactivity, e.g. a sleep or standby mode, when it is not being used in order to save power. This is typically the faster clock domain, with the slower clock domain being used as a timer during these periods. In these periods there is no communication between the two clock domains, however when the one clock domain exits the sleep or standby mode, it will often need to communicate with the slower clock domain. Furthermore, the fast and the slow clock domains may not necessarily be synchronised with each other.

It is known in systems which include different frequency clock domains to employ a "handshaking" procedure in which the clock domains negotiate parameters in order to establish that the slower clock domain does not change the data signal being transferred during its transfer to the faster clock domain, e.g. by the use of busy flags. This is necessary so that a signal can be transferred from the slower clock domain during a safe period of the slower clock domain, i.e. away from a transition (in which the clock changes from zero to one) in the slower clock domain and in a period in which the slower clock domain does not change the data signal to be transferred, in order to avoid corruption of the signal or meta-stability of the system. This is because values in the slower clock domain will generally change at transitions in the slower clock. However the known handshaking procedures are relatively slow as they require multiple cycles of the slower clock domain to achieve synchronisation between the clock domains. As well as being slow, this consumes a significant amount of power, since the faster clock domain must be kept running during the procedure. Also, in many applications, it is undesirable to freeze the signal in the slower clock domain, e.g. a timer which must count continuously. A known solution to this problem is to introduce extra shadow registers in the slower clock domain, combined with a flag telling the faster clock domain which shadow register bank it can consider stable. However, this increases the amount of required logic significantly.

It is an aim of the present invention to provide improved systems and methods for communication between two clock domains of different frequencies.

When viewed from a first aspect the invention provides an arrangement for transferring a data signal from a first clock domain to a second clock domain in a digital system, wherein the first clock domain comprises a first clock having a frequency less than a frequency of a second clock in the second clock domain, the arrangement being configured to:
 transfer the data signal from the first clock domain to the second clock domain;
 detect whether a predetermined transition occurs in the first clock within a predetermined period of time, using detecting means clocked by the second clock; and
 transfer the data signal from the first clock domain to the second clock domain again if the detecting means detects said predetermined transition in the first clock within the predetermined period of time.

The invention also provides a method of transferring a data signal from a first clock domain to a second clock domain in a digital system, wherein the first clock domain comprises a first clock having a frequency less than a frequency of a second clock in the second clock domain, the method comprising:
 transferring the data signal from the first clock domain to the second clock domain;
 detecting for a predetermined period of time whether a predetermined transition occurs in the first clock, using detecting means clocked by the second clock; and
 transferring the data signal from the first clock domain to the second clock domain again if the detecting means detects said predetermined transition in the first clock within the predetermined period of time.

Thus it will be appreciated that instead of using handshaking and/or busy flags, in accordance with the invention the data signal is simply transferred from the first clock domain to the second clock domain but a check is carried out as to whether or not a clock transition occurred in the first clock within the predetermined period. If a transition is detected, the data signal from the first clock domain is transferred again to the second clock domain, otherwise the initial transfer of the signal is deemed to have been "safe", i.e. there is no risk of meta-stability. The Applicant has appreciated that this results in a faster transfer of the data signal from the first clock domain to the second clock domain because a check is made of the first clock which is clocked by the second clock. For example, in known arrangements involving handshaking, the synchronisation and transfer time is typically at least two first clock cycles, i.e. two slow clock cycles, compared to the synchronisation and transfer time for embodiments of the present invention which can be as little as a few second clock cycles, i.e. a few fast clock cycles. The transfer of the data signal subsequent to a transition in the first clock could be at the end of the predetermined period, e.g. at a corresponding transition of the second clock, but preferably occurs at the subsequent transition in the second clock.

The detecting means could be arranged to detect a positive and/or a negative transition, i.e. the data values in the first clock domain could change on one or both of the positive and negative transitions of the first clock, depending on the implementation of the system and the technology used. However, in a set of embodiments the transition being detected is a positive transition The check of the first clock is made to ensure that its cycle was away from a transition—i.e. either a positive transition from zero to one or a negative transition from one to zero, so that the initial transfer of the data signal from the first clock domain to the second clock domain did not coincide with a transition in the first clock cycle. This is because data values in the first clock domain are changed at one or both of the transitions of the first clock, which again depends on the implementation of the system, so transferring a value from the first clock domain at this time, i.e. while it is changing, could lead to data corruption or meta-stability.

The Applicant has appreciated that because the check of the first clock confirms that the data signal is safe to be transferred either the initial or subsequent transfer of the data signal takes place in a safe part of the first, slow clock cycle. In some embodiments the data signal is not transferred from the first clock domain to the second clock domain via any of the synchronisation components in the arrangement, e.g. the detecting means. Furthermore there is no need to synchronise the data signal to the second clock domain. In a particular set of embodiments there is no component introducing a clock cycle time delay between the transfer of the data signal from the first clock domain to the second clock domain.

Although this is of some benefit for single bit signals, it is of significant benefit for multi-bit buses, since the whole bus can be reliably transferred on the basis of the check made on the first clock. Therefore in one set of embodiments the first clock domain comprises a first bus, the second clock domain comprises a second bus, and data is transferred from the first bus to the second bus, both initially and if a subsequent transfer is deemed necessary. It also means that embodiments of the invention do not need to introduce the latency associated with serial flip flops or other arrangements typically used to match clock domains in the prior art.

In some embodiments of the invention the data bus comprises at least 8, 16 or 32 bits, though it will be appreciated that the bus could comprise any number of multiple bits.

A further benefit in reducing power consumption may be achievable with a quicker transfer as it allows one or both of the clocks to go into a sleep state more quickly if appropriate. For example, the known handshaking procedures require multiple slower clock cycles to complete, during which the faster clock is kept running. This can consume a significant amount of unnecessary power, especially if the slower clock domain includes a low power low frequency clock and the faster clock domain is high power, which is a common arrangement in a low power device.

The check for the predetermined transition in the first clock could be carried out throughout the predetermined period of time. However, in one set of embodiments the detection comprises discrete sampling of the first clock based on another clock—preferably the second clock. This enables, in some embodiments, the data signal to be re-transferred, if necessary, as quickly as possible, i.e. the discrete sampling allows the predetermined transition in the first clock to be detected shortly after it occurs so that the data signal can be transferred after this detection. In one set of embodiments the detecting means comprises an edge detector, e.g. a positive edge detector. This could, for example, at each point of the discrete sampling compare the value of the first clock to its previous value, so that a transition in the first clock can be detected if it occurred in that sampling period. The edge detector is, as mentioned above, conveniently clocked by the second clock.

The detection of a transition in the first clock requires a finite amount of time: the first clock transition has to enter the detecting means and the resultant logic signals have to be transferred through the detecting means and any other components which may rely on them in order to effect the transfer of the data signal between the first clock domain and the second clock domain. Generally the predetermined period over which the detecting means looks for a transition in the first clock is greater than the time taken for a change of signal in the first clock domain to stabilise at a valid value and the time taken for a clock transition to propagate through the detecting means. For example, the number of sampling points in the discrete sampling will generally be related to the time taken to propagate these logic signals through the necessary components. In one set of embodiments the predetermined period is between 1 and 16 cycles of the second clock, e.g. between 2 and 8 cycles of the second clock, e.g. 4 cycles of the second clock. However, it is not necessary for the predetermined period to correspond to an integer number of cycles of the second clock, for example if it is clocked by a different clock. If a transition has not been detected in the predetermined period, it can be safely assumed that the initial transfer of the data signal from the first clock domain to the second clock domain did not coincide with a transition in the first clock.

The elapse of the predetermined period could be timed by any suitable timing mechanism, e.g. a timer or counter. However, as discussed above, in some embodiments the detection of a transition in the first clock comprises a number of steps and/or is carried out over a number of cycles of the second clock. Therefore preferably the detecting means comprises means to count the multiple steps of the discrete sampling and/or the number of cycles in the predetermined period. This could be a component such as a down counter, a gray-code counter, or one or more flip-flops in series. Preferably the counting means is clocked by the second clock, i.e. synchronised with the detecting means.

In a set of embodiments detection of the predetermined transition in the first clock cycle could be performed at any transition (either positive or negative) of the second clock. In one set of embodiments the detection is performed at a rising edge, i.e. positive transition, of the second clock, e.g. this marks the start of the predetermined period. As discussed above, the detection may comprise multiple steps, with subsequent steps being performed at a subsequent, e.g. the next, rising edge of the second clock. Preferably the frequency of the discrete sampling equals the frequency of the second clock,—i.e. a sample is carried out on every cycle of the second clock during the detection, in order to detect a transition as soon as possible therefore allowing the fastest possible re-transfer of the data signal if necessary (although this is not essential—it may always wait until the end of the predetermined period to transfer the data again). When the data signal is re-transferred after a transition in the first clock, the ratio of the frequency of the second clock to the first clock should be great enough such that it can be guaranteed that a further transition in the first clock will not occur during the time taken to effect the transfer of the data signal from the first clock domain to the second clock domain.

Although the frequency of the second clock could be an integer multiple of the frequency of the first clock and/or have a fixed phase, in general no synchronisation or particular relationship is required in accordance with the present invention. Furthermore, embodiments of the invention may be tolerant to the first and/or second clock domain entering a sleep or standby mode and restarting asynchronously with respect to the other clock domain.

In one set of embodiments the frequency of the second clock is at least four times the frequency, e.g. at least ten times the frequency, e.g. at least one hundred times the frequency, e.g. at least one thousand times the frequency of the first clock. As well as satisfying the advantages and reasons given above for the ratio of the clock frequencies, this ensures that there is sufficient time to detect and process the predetermined transition and transfer the data again without risk of there being a further transition and the associated risk of data corruption or meta-stability. As the detecting means is clocked by the second clock, this generally means that the predetermined period (of a few second clock cycles) is much less than the period of the first clock, so that following a transition in the first clock, all the necessary logic signals can pass through the arrangement and transfer the data from the first clock domain to the second clock domain again before the next transition in the first clock where data values in the first clock domain may again change. It also reflects the different clock domains present in commercial products. In an exemplary set of embodiments the frequency of the first clock is 32 kHz and the frequency of the second clock is 16 MHz.

As discussed above, the detecting means could comprise an edge detector arranged to compare the values at an input on consecutive clock cycles. However, any suitable arrangement depending on the nature of the check could be provided, i.e. any component or arrangement which is able to detect a transition in the first clock. Therefore generally the detecting means will have the first clock as an input. In another set of embodiments the detecting means comprises a flip-flop, e.g. a D-type flip-flop, or a comparator. More than one flip-flop could be provided in series to increase the certainty of the check performed by the flip-flop. There is a small chance that the output from the flip-flip will be in an unstable state that takes some time to resolve itself—e.g. if the check is made just as the first clock is going through a transition. However, if this output is then fed into the input of a further flip-flop, the chance of an unstable state being passed through both the flip-flops is very small, i.e. because the probabilities are multiplicative.

In one set of embodiments, the check for a transition in the first clock could be performed all the time, e.g. every cycle of the second clock. However, in another set of embodiments the system comprises means for initiating the predetermined period. This could be a specific signal which is sent in order for the predetermined period to start, or it could be linked to other signals or cycles in the system. For example, the predetermined period could be initiated by a change in the input signal, by the system or second clock domain entering or exiting a standby or sleep mode, or by a central processing unit (CPU) requesting data to be read from the first clock domain. Embodiments in which the detection is initiated rather than being performed continuously are advantageous as they help the system to reduce the power consumption as the checks are only performed when necessary, and allows the second clock domain to go into a sleep mode during the period after the signal has been transferred and before the next transfer of a data signal is needed, thus saving power. Embodiments of the present invention may be particularly suited to a mode of operation in which the second clock domain requests a transfer of the data signal from the first clock domain, e.g. when the second clock domain exits a sleep or standby mode and requests a certain data signal—the time, for instance, which provides the signal to start the predetermined period.

As discussed above, the predetermined period will generally be fixed and last for a set number of second clock cycles following its initiation. However, embodiments are envisaged in which the transition detection is terminated once a transition in the first clock has been detected and the necessary logic signals to indicate this have passed through the arrangement i.e. before expiry of the predetermined period. This is because once it is indicated that it is safe to transfer the data signal from the first clock domain to the second clock domain again, the fact that the first clock is slower than the second clock guarantees that there will not be a further transition in the first clock when the data signal is transferred again, so there is no point in continuing the detection for any longer than this.

In accordance with embodiments of the invention the transferred data signal can be changed at any time during synchronisation, i.e. during the predetermined period, without affecting the synchronisation process or the resultant re-transfer, if necessary, of the data signal from the first clock domain to the second clock domain, e.g. by causing meta-stability in the output signal. This is in contrast to the conventional handshaking procedure in which a freeze is put on the data signal being transferred from the first clock domain, e.g. through the use of busy flags, in order to perform the synchronisation between the first and second clock domains. This clearly adds to the time taken to complete the transfer and therefore power consumed by the system. It will be appreciated that the present invention removes these restrictions resulting in a faster transfer of the data signal which consumes less power.

By having, in a set of embodiments described above, the detecting means being clocked by the second clock and taking the first clock as its input, the arrangement simply generates a "safe" synchronisation signal in order to determine whether or not it needs to transfer the data again from the first clock domain to the second clock domain again. It therefore does not matter as to the state of the data signal, which can change during the predetermined period, i.e. it is the value of the data signal in the first clock domain at the end of, or at another time during, the predetermined period which is transferred to the second clock domain if there has been a transition in the first clock cycle, which will generally mean that the value of the data signal will have changed. If there is no transition in the first clock cycle during the predetermined period, the data signal remains that which was transferred initially as generally this will mean that the data signal has not changed value.

However, in the case when a transition in the first clock is detected, the most recent data signal in the first clock domain will be transferred to the second clock domain following the transition.

This freedom to change the data signal in the first clock domain during the predetermined period contrasts with the conventional approach in which the data signal to be transferred is not allowed to be changed during synchronisation of the two clock domains. This is because the synchronisation process, e.g. handshaking and/or involving busy flags, involves checking of the data signal to be transferred, as well as the clock cycles. This puts restrictions on the entire system and its usage. For example, a CPU is required to poll a flag that tells the system when the synchronisation is complete. The system of the present invention is free from these restrictions thus allowing greater freedom in its uses and architecture.

In one set of embodiments the system comprises means for storing the data signal, e.g. a storage device or component, with the method comprising the step of storing the data signal. This allows the data signal to be stored temporarily before it is output to the second clock domain, for either or both of the initial transfer and the subsequent transfer if necessary. The data signal could also be stored during the predetermined period, i.e. while the check of the first clock is being made and the logic signals are passing through the detecting means.

The means for storing the signal input from the first clock domain could comprise any suitable data storage component, arrangement or device which is able to store the data signal during unsafe parts of the first clock cycle and/or during the predetermined period so that the signal is ready to be output to the second clock domain when the check is started and/or after the check of the first clock has been performed. This could comprise a register, e.g. a flip-flop or a latch. For a system arranged to transfer a multi-bit bus, multiple components may be provided depending on the size of the bus, e.g. multiple flip-flops in parallel. Such a component may store the input signal until it receives a signal, e.g. from the detecting means, that it is safe to transfer it to the second clock domain. Furthermore, a hold could be put on the data signal in the storing means to prevent the transfer occurring before the predetermined period has elapsed. The storing means could receive the data signal from the first clock domain, i.e. the storing means and the first clock domain could comprise separate components: one to receive the input signal and one to store the input signal. However this function could also be performed by the first clock domain which receives and stores the data signal prior to it being transferred.

When the data signal is initially transferred, it is not yet known whether or not this data signal is safe to be used by the system, i.e. the initial transfer is made speculatively in the hope that the first clock was in a safe part of its cycle at the time, which owing to the relative frequencies of the first and second clock domains is generally likely. However, if the transfer was made at a transition in the first clock the data signal may be corrupt or meta-instable. In these circumstances it is therefore not a good idea to propagate this signal throughout the rest of the system, e.g. by reading the second bus to which the signal was transferred. Therefore in one set of embodiments the arrangement comprises means to prevent the initially transferred data signal being read by the second clock domain. This block on the data signal being read by the second clock domain could comprise a "ready" signal, e.g. set to zero when the block is in place and set to one when the data signal has been determined to be safe and ready to be read by the second clock domain. This ready signal could be linked to the detecting means and/or the predetermined period. For example, if the arrangement comprises a timer or counter, the ready signal could be issued at a particular point relative to the predetermined period, such as at the end of the predetermined period.

Once the check of the first clock has been made and the predetermined period is over, either the initial transfer of the data signal is known to be safe or the subsequent transfer has been made which, as already discussed, is known to be safe, the block on the second clock domain reading the data signal can be lifted.

Figure 2:
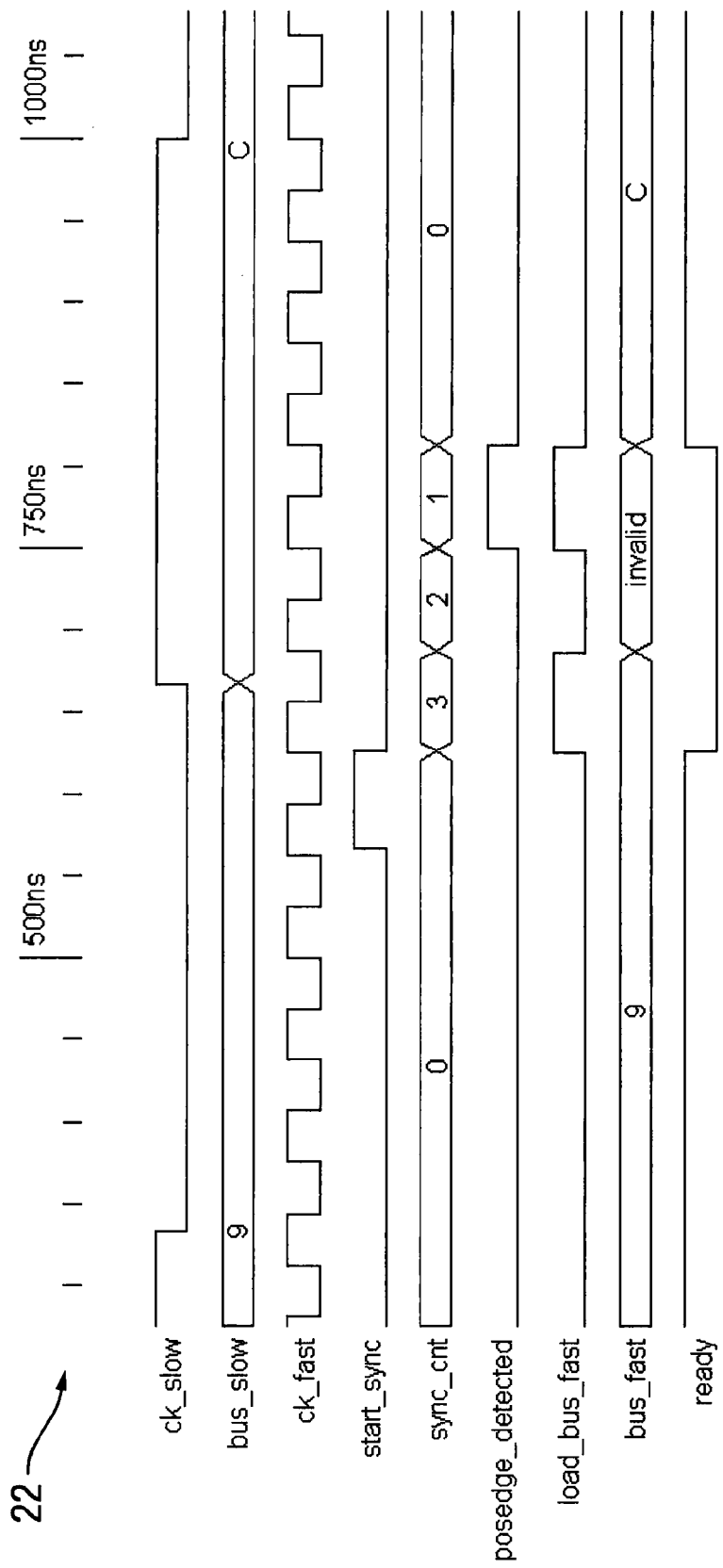

Certain embodiments of the invention will now be described, by way of example only, with reference to the accompanying drawings, in which:

FIG. 1 shows a diagram of an embodiment of a logic circuit in accordance with the invention; and FIG. 2 shows a timing diagram associated with the circuit diagram shown in FIG. 1.

FIG. 1 shows a schematic logic circuit diagram corresponding to an arrangement embodying the invention. The arrangement is arranged to transfer data from a first bus, bus_slow, in a first clock domain to a second bus, bus_fast, in a second clock domain. The frequency of the first clock, ck_slow, is less than the frequency of the second clock, ck_fast, with typical frequencies being 32 kHz for the first clock, ck_slow, and 16 MHz for the second clock, ck_fast.

The arrangement comprises a positive edge detector 2 for the first clock, ck_slow, which the positive edge detector 2 takes as its input. The output, posedge_detected, from the positive edge detector 2 is a one if a positive edge in the first clock, ck_slow, has been detected, and a zero otherwise. The second clock, ck_fast, is used to clock the positive edge detector 2, such that at each rising edge of the second clock, the value of the input, ck_slow, is sampled and compared to its value at the previous rising edge of the second clock.

The arrangement also comprises a down counter 4, which takes as its input an initialisation signal, start_sync, which indicates that the synchronisation process is to start in order to transfer the data. The output, sync_cnt, from the down counter 4, is the value of the count, which is in an integer that is reduced by one at each count. In the embodiment shown in FIG. 1 the count is always started at three. The second clock, ck_fast, is also used to clock the down counter 4, i.e. at each rising edge of the second clock, the down counter reduces the value of its output, sync_cnt, by one.

The output, sync_cnt, from the down counter 4 is fed to a decision node 6. There are three outputs 8, 10, 12 from the decision node 6, depending on the value of the output, sync_cnt, from the down counter 4. The first output 8 has a value of one if the output, sync_cnt, from the down counter 4 is equal to zero. The second output 10 has a value of one if the output, sync_cnt, from the down counter 4 is equal to three. The third output 12 has a value of one if the output, sync_cnt, from the down counter 4 is not equal to zero. As will be appreciated, the second and third outputs 10, 12 from the decision node 6 can both have a value of one, i.e. when the output, sync_cnt, from the down counter 4 has a value of three. When the value of the output, sync_cnt, from the down counter 4 is equal to zero, a signal, ready, is output to the system indicating that the data from the first bus, bus_slow, has been transferred and the arrangement is ready to receive a further initialisation signal, start_sync.

The output signal, posedge_detected, from the positive edge detector 2 is combined with the third output 12 from the decision node 6 in an AND gate 14, with the output from the AND gate 14 being combined with the second output 10 from the decision node 6 in an OR gate 16. The output, load_bus_fast, from the OR gate 16 is fed to the selector input of a multiplexer 18. The inputs to the multiplexer 18 are the data signal from the first bus, bus_slow, and the output data signal to the second bus, bus_fast. The output from the multiplexer 18 is fed to a D-type flip-flop 20 which is clocked by the second clock, ck_fast. The Q output from the flip-flop 20 is the output to the second bus, bus_fast.

Operation of the system will now be described with reference to FIG. 1 as well as FIG. 2 which shows the sequence of logic signals passing through the system. A representative time scale 22 is given in subdivisions of 50 ns. As shown in FIG. 2 and for the purposes of illustration, the frequency of the second clock, ck_fast, from the second, higher frequency, clock domain 4, is taken to be 16 MHz and the frequency of the first clock, ck_slow, from the first, lower frequency, clock domain 8, is taken to be 1.5 MHz. In practice these are likely to be more disparate, as has been detailed previously, but here these more comparable values have been chosen for the convenience of illustration.

Initially the system is in a state in which the multi-bit data h9 (a hex value) is in the first bus, bus_slow, and the second bus, bus_fast, is unknown, i.e. the value in the bus is that from the previous transfer. The system is in a steady state until at 565 ns the initialisation signal, start_sync, changes from zero to one, thus triggering the start of the synchronisation process. Typically the initialisation signal will be generated by the second clock domain (generally controlling a higher power peripheral device) when it exits a sleep mode in order to request transfer of the data from the first clock domain (generally a lower power timing circuit). At 625 ns, the down counter 4, is clocked by the next rising edge of the second clock, ck_fast, causing it to start counting down from three, i.e. at 625 ns the output, sync_cnt, from the down counter 4 changes to three. It is necessary for the down counter 4 to count down from three because the positive edge detector 2 takes two cycles of the second clock, ck_fast, for a positive transition to be detected, i.e. for the necessary logic signals to be passed through its flip-flops.

This output value of three for sync_cnt from the down counter 4 causes the first output 8 of the decision node 6 to have a value of zero and the second and third outputs 10, 12 of the decision node 6 to have a value of one. Regardless of the output, posedge_detected, from the positive edge detector 2, these inputs to the OR gate 16 cause the output, load_bus_fast, from the OR gate 16 to have a value of one. This value of one which is fed to the selector input of the multiplexer 18 causes the data signal h9 in the first bus, bus_slow, to be fed to the D input of the flip-flop 20, such that on the next rising edge of the second clock, ck_fast, the data signal h9 is transferred to the second bus, bus_fast.

In the meantime, at each rising edge of the second clock, ck_fast, the positive edge detector 2 checks for a positive transition in the cycle of the first clock, ck_slow. At 670 ns the first clock, ck_slow, has a positive transition. In this example this transition is associated with a change in the data signal in the first bus, bus_slow, from h9 to hC, but in other situations the data signal may remain the same. At 750 ns, at the rising edge two cycles later of the second clock, ck_fast, which clocks the positive edge detector 2, the output, posedge_detected, from the positive edge detector 2 changes to one, indicating that the positive transition in the first clock, ck_slow, has been detected. This value of one, combined with the value of one from the third output 12 from the decision node 6 (i.e. at this point the output, sync_cnt, from the down counter 4 is one, which is not equal to zero), causes the AND gate 14 to have an output value of one, and also the OR gate 16 to have an output value, load_bus_fast, of one. This means that because the positive transition in the first clock, ck_slow, took place during a transition in the second clock, ck_fast, in which the data signal was being transferred initially from the first bus, bus_slow, to the second bus, bus_fast, the data in the first bus is transferred again.

As before, a load_bus_fast value of one which is fed to the selector input of the multiplexer 18 causes the data signal, which is now hC, in the first bus, bus_slow, to be fed to the D input of the flip-flop 20, such that on the next rising edge of the second clock, ck_fast, the data signal hC is transferred to the second bus, bus_fast. The frequency of the first clock, ck_slow, is sufficiently low to ensure that the transfer of the data signal is completed before a further positive transition in the first clock will occur.

At 812.5 ns the output, sync_cnt, from the down counter 4 has reached zero, which causes the value of the first output 8 from the decision node 6 to be one, indicating that the system is ready to receive a new initialisation signal, i.e. the signal, ready, is equal to one. At this point, once the predetermined period has finished, the data signal stored in the flip-flop 20 is a valid and stable value which can then be used in the system as data synchronised to the second clock, ck_fast, e.g. output to the second bus, bus_fast, at this rising edge of the second clock, ck_fast, as described above. The second and third outputs 10, 12 from the decision node 6 are zero when the output, sync_cnt, from the down counter 4 is zero, so no new data signal can be transferred from the first bus, bus_slow, to the flip-flop 20 at this time. Therefore, in an embodiment (not shown), in which a positive transition does not occur within the predetermined period, i.e. during the counting down of the output, sync_cnt, from the down counter 4, but is detected when the output, sync_cnt, from the down counter 4 reaches zero, enough time will have elapsed after the data signal was initially transferred at the start of the predetermined synchronisation period that there is no risk of data corruption or meta-stability in this circumstance, because the positive transition in the first clock, ck_slow, did not occur at the same time as the initial transfer of the data signal and data values in the first bus, bus_slow, are only changed (the cause of meta-stability) at a positive transition in the first clock, ck_slow.

It will be appreciated by those skilled in the art that many variations and modifications to the embodiments described above may be made within the scope of the various aspects of the invention set out herein. For example it is not necessary to provide a final flip-flop to output the transferred data signal to the second bus, this could be performed by any other data storage component, or even just by opening up the circuit to enable the input signal to be transferred straight from the first bus. The length of the predetermined period could be a different value, particularly if this depends on the type of component used to detect a transition in the first clock, i.e. the time taken to get a decision out of this component, or if one or more of the components are clocked on both transitions of the second clock.

The invention claimed is:

1. An arrangement for transferring a data signal from a first clock domain to a second clock domain in a digital system, wherein the first clock domain comprises a first clock having a frequency less than a frequency of a second clock in the second clock domain, the arrangement being configured to:
    transfer the data signal from the first clock domain to the second clock domain;
    detect whether a predetermined transition occurs in the first clock within a predetermined period of time, using a detecting circuit portion clocked by the second clock; and
    transfer the data signal from the first clock domain to the second clock domain again only if the detecting means detects said predetermined transition in the first clock within the predetermined period of time.

2. An arrangement as claimed in claim 1, wherein the predetermined transition being detected is a positive transition.

3. An arrangement as claimed in claim 1, wherein the first clock domain comprises a first bus, the second clock domain comprises a second bus, and data is transferred from the first bus to the second bus, both initially and if a subsequent transfer is deemed necessary.

4. An arrangement as claimed in claim 3, wherein the first and second buses comprise at least 8 bits.

5. An arrangement as claimed in claim 1, wherein the detecting circuit portion comprises an edge detector.

6. An arrangement as claimed in claim 1, wherein the detection comprises discrete sampling of the first clock based on the second clock.

7. An arrangement as claimed in claim 6, wherein the detecting circuit portion comprises a counter to count the multiple steps of the discrete sampling.

8. An arrangement as claimed in claim 6, wherein the frequency of the discrete sampling equals the frequency of the second clock.

9. An arrangement as claimed in claim 1, wherein the predetermined period is between 1 and 16 cycles of the second clock.

10. An arrangement as claimed in claim 9, wherein the circuit portion comprises a counter to count the number of cycles in the predetermined period.

11. An arrangement as claimed in claim 7, wherein the counter is clocked by the second clock.

12. An arrangement as claimed in claim 1, wherein the detection is performed at a rising edge of the second clock.

13. An arrangement as claimed in claim 1, wherein the frequency of the second clock is at least four times the frequency of the first clock.

14. An arrangement as claimed in claim 1, wherein the detecting circuit portion has the first clock as an input.

15. An arrangement as claimed in claim 1, wherein the detecting circuit portion comprises a flip-flop.

16. An arrangement as claimed in claim 1, comprising an initiating circuit portion for initiating the predetermined period.

17. An arrangement as claimed in claim 1, comprising a storing circuit portion for storing the data signal.

18. An arrangement as claimed in claim 1, comprising a blocking circuit portion to prevent the initially transferred data signal being read by the second clock domain.

19. A method of transferring a data signal from a first clock domain to a second clock domain in a digital system, wherein the first clock domain comprises a first clock having a frequency less than a frequency of a second clock in the second clock domain, the method comprising:
    transferring the data signal from the first clock domain to the second clock domain;
    detecting for a predetermined period of time whether a predetermined transition occurs in the first clock, using a detecting circuit portion clocked by the second clock; and
    transferring the data signal from the first clock domain to the second clock domain again only if the detecting means detects said predetermined transition in the first clock within the predetermined period of time.

20. A method as claimed in claim 19, wherein the predetermined transition being detected is a positive transition.

21. A method as claimed in claim 19, wherein the first clock domain comprises a first bus, the second clock domain comprises a second bus, the method comprising transferring data from the first bus to the second bus, both initially and if a subsequent transfer is deemed necessary.

22. A method as claimed in claim 21, wherein the first and second buses comprise at least 8 bits.

23. A method as claimed in claim 19, wherein the detecting circuit portion comprises an edge detector.

24. A method as claimed in claim 19, wherein the detecting comprises discrete sampling of the first clock based on the second clock.

25. A method as claimed in claim 24, wherein the detecting comprises counting the multiple steps of the discrete sampling.

26. A method as claimed in claim 24, wherein the frequency of the discrete sampling equals the frequency of the second clock.

27. A method as claimed in claim 19, wherein the predetermined period is between 1 and 16 cycles of the second clock.

28. A method as claimed in claim 27, wherein the detecting comprises counting the number of cycles in the predetermined period.

29. A method as claimed in claim 25, wherein the counting is clocked by the second clock.

30. A method as claimed in any of claims 19, wherein the detection is performed at a rising edge of the second clock.

31. A method as claimed in claim 19, wherein the frequency of the second clock is at least four times the frequency of the first clock.

32. A method as claimed in claim 19, wherein the detecting circuit portion has the first clock as an input.

33. A method as claimed in claim 19, wherein the detecting circuit portion comprises a flip-flop.

34. A method as claimed in claim 19, comprising initiating the predetermined period.

35. A method as claimed in claim 19, comprising storing the data signal.

36. A method as claimed in claim 19, comprising preventing the initially transferred data signal being read by the second clock domain.

37. An arrangement as claimed in claim 10, wherein the counter is clocked by the second clock.

38. A method as claimed in claim 28, wherein the counting is clocked by the second clock.

* * * * *